United States Patent [19]

Moser et al.

[11] 3,834,132
[45] Sept. 10, 1974

[54] APPARATUS FOR CLEANING EXHAUST AIR FROM A WORKSHOP

[75] Inventors: Erwin Moser; Helmut Benda, both of Rheinfelden, Germany

[73] Assignee: Swiss Aluminium Ltd., Chippis, Switzerland

[22] Filed: June 26, 1972

[21] Appl. No.: 266,482

[30] Foreign Application Priority Data
June 30, 1971  Switzerland.......................... 9650/71

[52] U.S. Cl.................... 55/223, 51/231, 51/233, 55/242, 55/290, 55/354, 55/502, 226/23, 261/29, 261/80
[51] Int. Cl............................................ B01d 47/06
[58] Field of Search............... 55/290, 351–354, 55/231, 223, 502, 233, 234; 98/33, 115 SB; 261/29, 80; 26/63; 226/21, 23; 242/57.1; 210/400

[56] References Cited
UNITED STATES PATENTS

| | | | |
|---|---|---|---|
| 1,026,432 | 5/1912 | Dey........................................ 55/351 |
| 1,322,804 | 11/1919 | MacFadden .................... 55/351 UX |
| 1,749,594 | 3/1930 | Lyons ............................... 55/354 X |
| 1,880,017 | 9/1932 | Harmon............................ 55/353 X |
| 1,949,002 | 2/1934 | Annis................................... 55/290 |
| 2,256,665 | 9/1941 | Carson........................... 55/351 X |
| 2,639,780 | 5/1953 | Hardy.............................. 55/351 X |
| 2,795,288 | 6/1957 | Hirs ............................... 55/354 X |
| 2,997,132 | 8/1961 | Allander et al..................... 55/223 X |
| 3,019,855 | 2/1962 | Engle................................. 55/352 |
| 3,064,409 | 11/1962 | Schmitt........................ 55/233 UX |
| 3,312,335 | 4/1967 | Paris et al. ....................... 226/23 X |
| 3,392,655 | 7/1968 | Chambers et al. ............. 55/290 UX |
| 3,395,518 | 8/1968 | Krane .................................. 55/290 |
| 3,487,620 | 1/1970 | Klein et al. ...................... 55/354 X |
| 3,526,350 | 9/1970 | Tradewell et al................... 26/63 X |
| 3,651,862 | 3/1972 | Ballinger........................... 55/354 X |
| 3,717,978 | 2/1973 | Osborne............................ 55/351 X |

Primary Examiner—Frank W. Lutter
Assistant Examiner—Vincent Gifford
Attorney, Agent, or Firm—Ernest F. Marmorek

[57] ABSTRACT

Apparatus for cleaning exhaust air from a workshop, including a vertically-extending duct which is rectangular in horizontal cross section, a sheet of filter material in a horizontal plane covering the cross section of the duct, means for moving the filter material in the direction of the length of the cross section, and means for cleaning the filter material.

16 Claims, 9 Drawing Figures

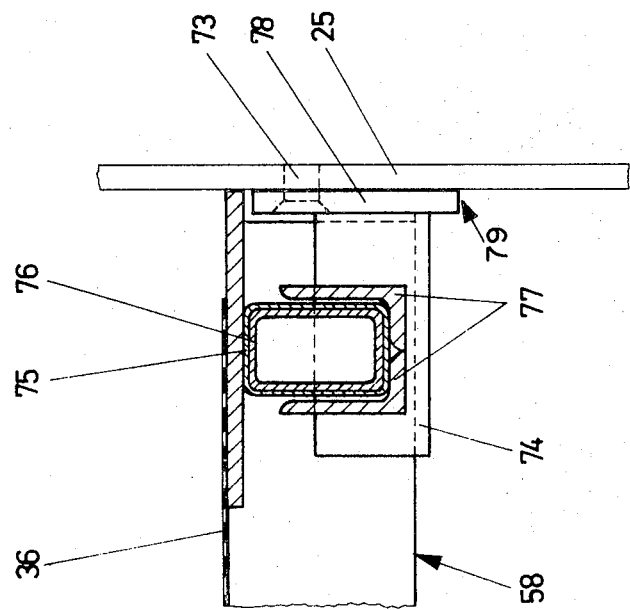
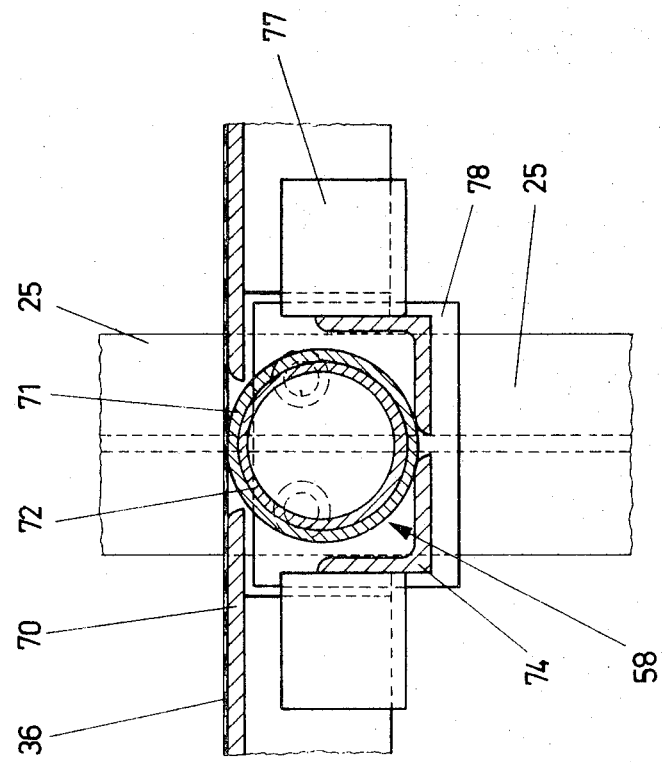

APPARATUS FOR CLEANING EXHAUST AIR FROM A WORKSHOP

Apparatus is known for the purification of the contaminated air from factory workshops where dust-emitting and/or gas-emitting devices, especially alunimum fusion electrolysis furnaces, are installed. This apparatus consists of a vertically-extending duct arranged in the roof of the workshop, a spray chamber provided in the lower part of the shaft, a filter arranged above the spray chamber and horizontally spanning over the clear internal width of the duct, with spray nozzles acting in the horizontal direction, a collector device for the spray liquid arranged beneath the shaft, a contaminated air inlet between the duct and collector device, and fans arranged on the duct.

To provide tolerable hygienic working conditions in, for example, a furnace workshop where aluminum fusion electrolysis cells are installed, the volume of air in the furnace workshop should be changed at least twenty times per hour. The contaminated air to be exhausted in this operation contains dust, tar vapours, and volumes of gas containing halogens such as fluorine, to the elimination of which special attention must be devoted to avoid environmental damage and damage to the furnace workshop and other works equipment. The apparatus as described above is intended to avoid damage of this kind and it satisfactorily fulfills its task.

However, the effectiveness of the apparatus, that is its capacity to expel contaminated air from workshops so as to be neutral to the environment, is largely dependent upon its condition of maintenance. Great expenses are necessary for the equipment enabling maintenance of the apparatus and for the personnel who carry out the maintenance. Thus, in the known form of apparatus, the filters which span the clear internal width of the duct are mounted in wooden filter frames. Although these filters are periodically cleaned by spraying with a water jet while in situ, at specific time intervals the filter frames must be taken out of the duct and replaced by cleaned frames. By reason of the enormous quantities of contaminated air handled, this maintenance work has to be carried out constantly, and special cleaning doors have to be provided in the longitudinal walls of the duct, and a catwalk extending along the duct has to be provided for access thereto. The filter frames, despite periodic cleaning, after a specific working time reach a degree of soiling which increases their weight by many times in relation to an unloaded frame. The load capacity of the supporting structure must be adapted to this final condition plus an appreciable safety factor. Thus, considering the whole apparatus, an extra investment expense is incurred which has no direct influence upon the effectiveness of the apparatus.

The spray nozzles produce a constant mist of liquid which is intended to bind the components contained in the workshop contaminated air and which promotes the rising of the workshop air. In the mist, fluorine-containing liquid particles are also formed which have a destructive effect upon the wooden frames, necessitating their frequent renewal which constitutes an additional material expense to keep the apparatus in operation.

The present invention provides improved apparatus for cleaning exhaust air from a workshop. Apparatus according to this invention includes a vertically-extending duct which is rectangular in horizontal cross section, a sheet of filter material in a horizontal plane covering the cross section of the duct, means for moving the filter material in the direction of the length of the cross section, and means for cleaning the filter material.

In furnace workshops of great length it can be expedient to provide several filters arranged in series in the direction of the length of the cross section of the duct, in order that the filters may be of manageable construction length.

The filters may consist of a flexible, fabric-like filter web which can be wound onto rollers or run around rollers.

Apparatus constructed according to the invention permits an extensive automation of the constantly recurring tasks which ensure the effectiveness of the installation for the purification of workshop contaminated air, whereby labour expenses can be saved, and permits constructional simplification of the duct construction by the elimination of the cleaning doors, the cat-walk and the filter frames, the absence of the filter frames additionally decreasing the capital expense. Moreover the filters formed in accordance with the invention do not reach the weight-increasing degree of soiling described in connection with the known apparatus, so that as a whole lower static loads have to be taken into account in the design.

According to the nature and quantity of the components in all states of aggregation which are contained in the workshop contaminated air and have to be eliminated, it may be preferable to have several sheets of filter material, one above the other. Conveniently two sheets of filter material are constituted by an endless belt of filter material. This reduces the costs for their drive by half.

To protect the drive systems against harmful effects deriving from the current of contaminated air, at least one roller can be screened off from the workshop contaminated air by a wall in which is an opening for the passage of the filter material. Thus the roller is in a housing within the duct. It is desirable to provide a seal in the passage opening. In the case of a single filter which can be wound onto and off from two rollers, this can be a sliding seal abutting on both sides on the filter. If on the other hand there is an endless belt, the seal part can be formed as a flap between the runs of the belt arranged to pivot about an axis transverse to the duct and thereby make sealing engagement with both runs of the belt. This flap may be formed on its outer ends with sealing strips, for simplified maintenance. Of course sliding seals as mentioned above can be provided on the wall parts lying opposite to the sealing strips and defining the passage opening. Flat brushes are satisfactory as sealing strips, as they protect the filter belt against mechanical action, and sliding seals of flat brush type are also suitable for stationary installation on the edges of the passage opening.

Particular economic importance pertains to the recovery of gases, vaporisation and condensation products, sublimates and dusts from the contaminated air from furnace workshops, especially in the purification of the contaminated air from furnace workshops having aluminum fusion electrolysis cells installed therein. In order to take account of this, an advantageous further development can be that the means which cleans the filters of adhering components is arranged within the housing and close to the rollers.

The cleaning means can consist of a pressure water spray device or a stationary or rotating brush with water supply. In the case of a rotating brush, a direction of rotation should be selected which ensures conveying away of the contaminated components removed from the filter in the direction of the entering filter belt. If a rotating brush is provided beneath the emerging filter belt, the filter belt discharge should take place in a direction opposite to the direction of movement. The pressure water spray devices, which can be combined with brushes, are preferably so arranged that the discharge does not again wet another filter. In the case of a circulating filter belt, a pressure water spray device can be provided with a downward spray nozzle between the entering and the emerging runs of a belt. It is also possible to provide several rollers arranged vertically one above the other, in a housing with a cleaning device per roller.

The discharge removed from the filters can be supplied to a recovery system which increases the economy. There can be advantages in avoiding the separation of the sprayed harmful substances in a separate clarification plant, and instead the substances separated from the filters may be dried in the housing and thereupon drawn away by suction.

It has also appeared that, in comparison with the known apparatus, the cleaning of the filter formed in accordance with the invention by means of a pressure water spray device, or by means of a brush with water supply, or with the aid of the combination of both means, permits in appreciable reduction of the washing liquid consumption. According to the speed of movement of the filters, adapted to the minimum necessary quantity of washing liquid, discharge concentrations can be achieved which are most favourable for the rapid settlement of the solids and re-use of the washing liquid transporting the solids. Removal of harmful substances contained in dissolved form in the washing liquid can be provided for if necessary, so that the concentration in the washing liquid does not exceed a permissible maximum by reason of the circulation.

By suiting the speed of movement of the filter or filter webs to the amount of foreign substances occurring per cubic metre of workshop contaminated air, the effectiveness of the apparatus according to the invention can be made optimal, and at the same time one can ensure that the effectiveness does not fluctuate beyond permissible limits, as may happen in the known installation. For further optimisation of the effectiveness, the installation can be developed so that escape of unpurified workshop contaminated air is prevented. Thus precautions can be taken for ensuring that the whole current of workshop contaminated air passes through the filter material. As one precaution, a device arranged close to each drive roller and ensuring straight running of the filter or filter webs can be provided. Moreover, the longitudinal edges of each sheet of filter material can be guided in sealing manner close to the longitudinal walls of the duct, without mechanical action such as would have destructive effect upon the filter material.

The invention will be explained in greater detail by reference to the accompanying drawings, which show one example of apparatus embodying the invention and a modification. In these drawings:

FIGS. 7 and 7A are sections, similar to FIGS. 6 and 6A, showing a modification.

FIG. 1 shows a longitudinal section through the apparatus, with central parts omitted. Since the construction shown in FIG. 1 is repeated in the longitudinal direction of the factory workshop, this partial illustration is adequate to explain the invention.

Figure 1:
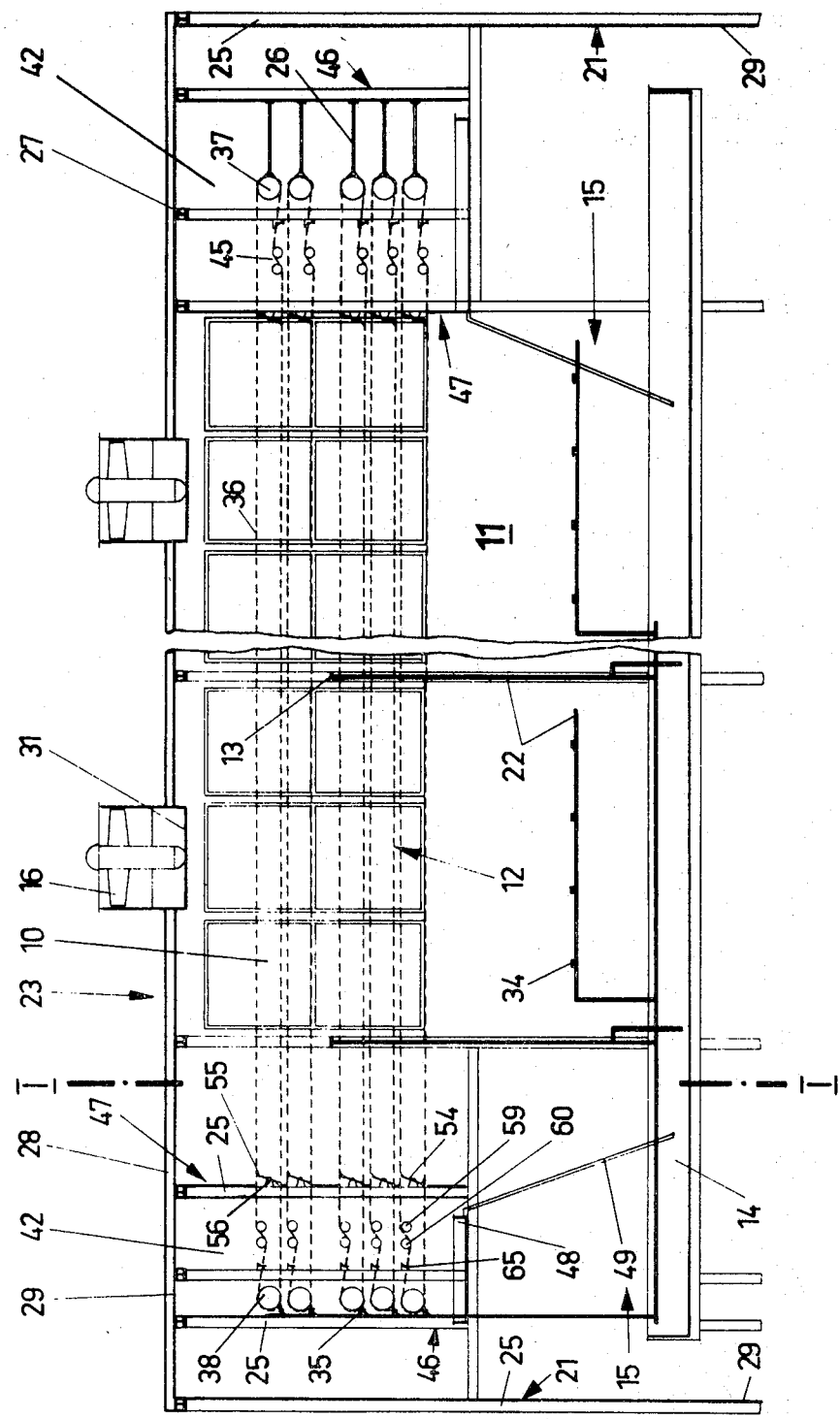
FIG. 1 shows a longitudinal vertical section through part of the length of the apparatus.

As shown in FIG. 1, the apparatus consists essentially of a duct 10 arranged in the roof of the factory workshop. In horizontal section, this duct is rectangular, having a length several times its breadth. The lower part of the duct acts as a spray chamber 11. There are filters 12 arranged above the spray chamber 11 and horizontally spanning over the clear internal width of the duct 10, with spray nozzles 13 acting in the horizontal direction. There is a collector device 14 arranged beneath the duct 10 for the spray liquid. Contaminated air enters the shaft through contaminated air inlets 15 between the duct 10 and the collector device 14. There are fans 16 at the top of the duct 10.

The duct 10 is formed as a housing open downwards, to fit an aperture 18 extending along the roof ridge 17. The housing consists of two vertical walls 19 and 20 extending parallel along the entire longitudinal extent of the factory workshop, these walls being united with one another at the respective ends of the factory workshop by short walls 21 so as to form a framelike structure. The housing forming the duct 10 is completed by a horizontally extending top wall 23 which rests upon the wall parts 19, 20 and 21. The duct 10 is connected with the roof in air-tight manner so that the whole of the contaminated air is forced to pass through the duct 10, without any possibility of flowing directly out into the atmosphere.

In order to reduce the static load which weigh upon the roof construction of the factory workshop, it has proved expedient to make the duct in a weight-saving manner. For this purpose, girders 25 rising vertically from the rafters 24 are used which are arranged at a distance of half the duct width from the ridge 17. The girders 25 are connected with one another in the transverse and longitudinal directions at the free ends remote from the roof ridge by means of girders 27, 28, so that a skeleton-type framework is produced, on the inside of which panels 29 are attached in air-tight manner to form the duct 10. The fitting of the panels 29 to the skeleton-type framework of the shaft 10 can be effected by means of screws or similarly easily operable securing means, which offers the advantage of easy access to the interior of the duct. Sealing devices 30 are secured to the panels, for sealing the panels 29 to the skin of the roof.

To assist the passage of the contaminated air through the duct 10, at uniform intervals along the duct there are apertures 31 in the top wall to which the suction sides of axial fans 16 are connected. The number and power of the axial fans are determined essentially according to the quantity of the workshop contaminated air to be passed through the installation per unit of time, and they reinforce the natural upward movement of the contaminated air which exists in the factory workshop.

Below the open lower end of the duct 10 there is a collector device 14, extending the length of the aperture 18. The collector device 14 consists of a trough, open upwards, having at least the same width and longitudinal extent as the duct 10. The trough is suspended from the rafters 24 by means of rods 32. Since the trough collects a corrosive liquid, it has proved advantageous to make the trough resistant to decomposition by making it of a plastics material which is specially suited to resist the corrosive component or components of the liquid. In the present example, to achieve this aim, polyethylene is used.

From the trough a drain 33, peferably of the same material as the trough, conducts the liquid to a plant (not shown) for the recovery of clean spray liquid.

It is not essential to provide a single trough extending the length of the duct; several troughs arranged in series can equally be used. The distance of the upper side of the trough from the open lower end of the duct 10 is chosen so that sufficiently large inlets 15 for contaminated air are formed, through which the contaminated air can enter the shaft on both sides.

Figure 2:
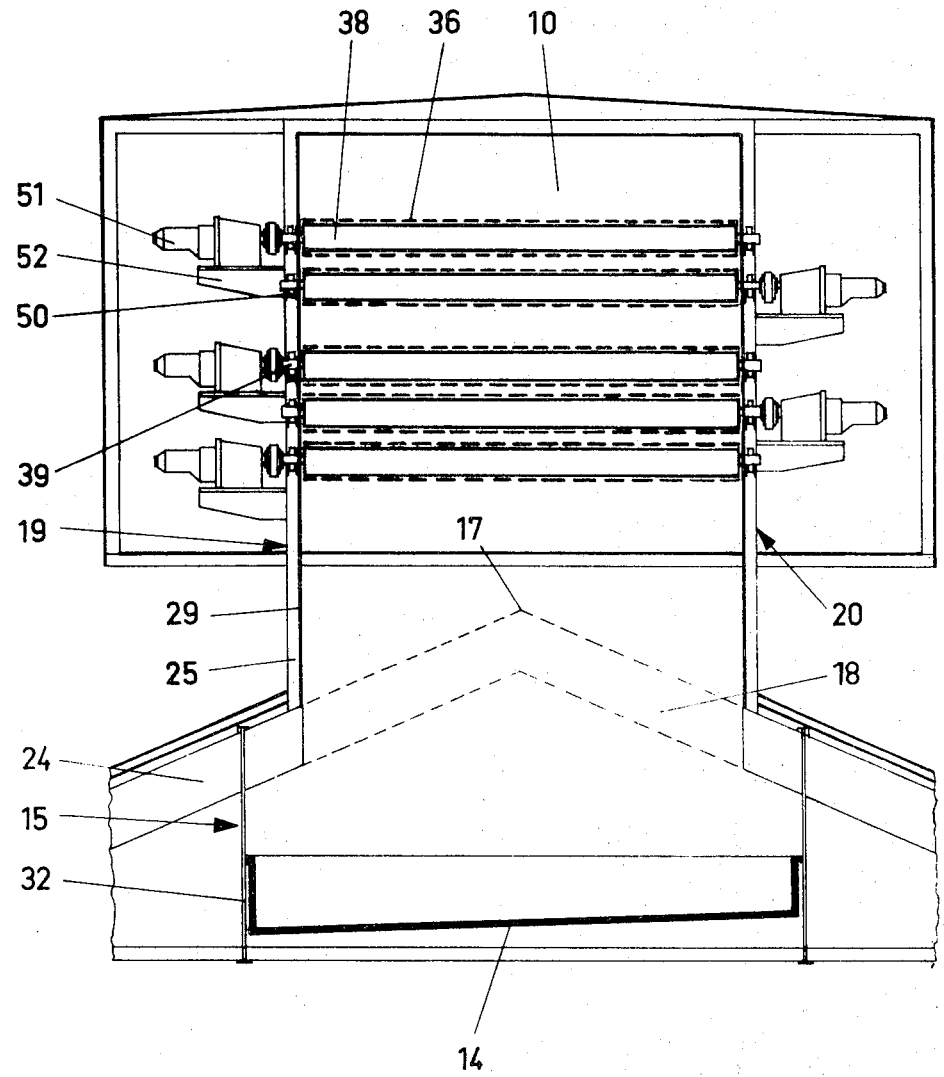
FIGS. 2 and 3 are transverse vertical sections, looking respectively to the left and right from a sectional plane I—I in FIG. 1.
Figure 3:
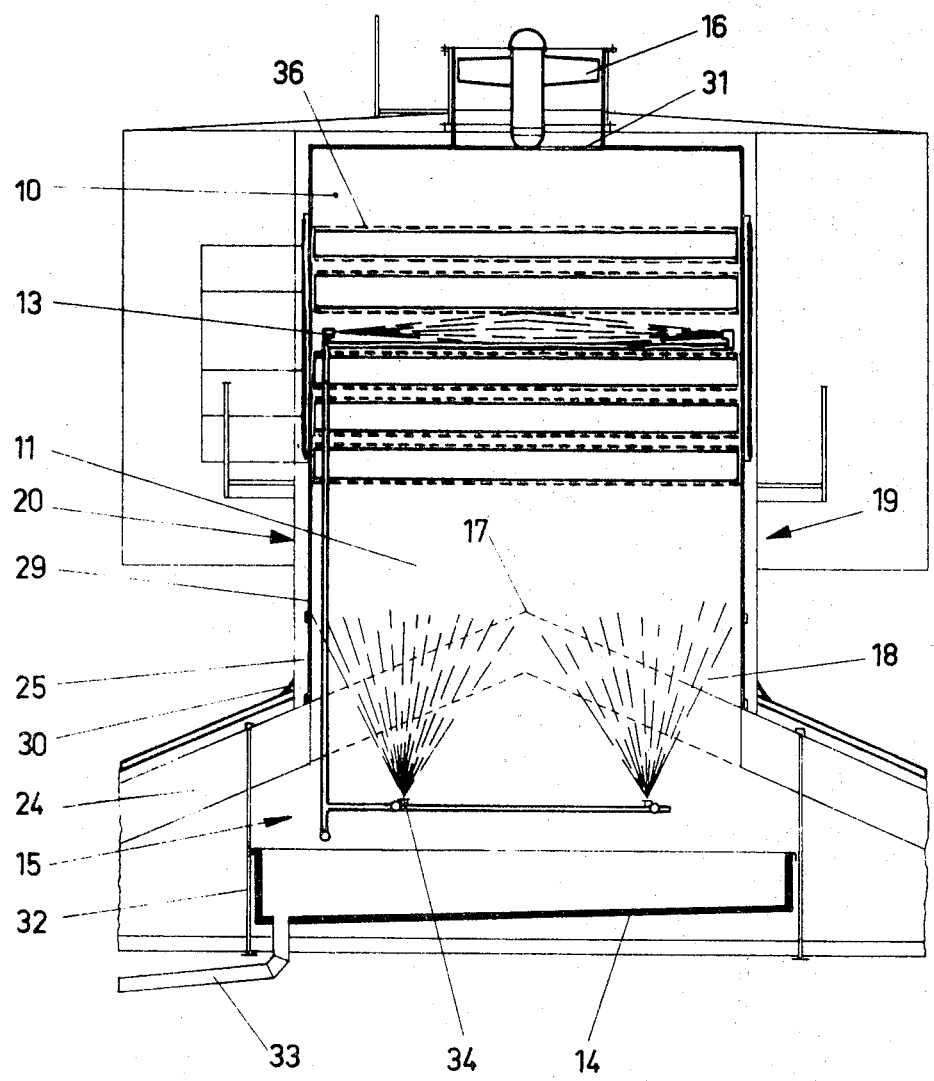

The spray chamber 11 is a lower part of the duct 10 through which filters do not pass. The area of the spray chamber 11 in plan corresponds to that of the duct 10. The height of the chamber 11 is determined according to parameters of the contaminated air. As shown in FIGS. 1, 2 and 3, spray nozzles 34 are distributed throughout a lower part of the spray chamber 11, which nozzles are directed upwards and maintain in the spray chamber 11 an almost stationary mist. By an almost stationary mist we means a body of atomised liquid which is substantially constant in its extent and is in itself constantly being renewed without however varying in volume. The spray nozzles 34 propel liquid vertically towards the filter or filters 12, essentially forming a spray cone and also bringing about an injector effect in the contaminated air inlets 15. Under the influence of the flowing contaminated air as one parameter, the mist is propelled until, due to the absorption of deposits, the weight of the drops predominates over the propelling force of the contaminated air, whereupon the drops descend against the flow of contaminated air. Thus an upper mist level forms, and the first filter 12 is placed at a certain distance above this level. The time of residence of the contaminated air current from the workshop in this mist zone is to be regarded as a further important parameter for the purification of the contaminated air, especially from factory workshops with aluminum fusion electrolysis cells installed therein, since the objective is at this stage as far as possible to separate out all water-soluble accompaying substances in the contaminated air, such for example as fluorine, by absorbtion in water droplets. Settlement of solid substances on liquid particles also takes place in the spray chamber, and here especially the heavier of the dust particles are deposited on water droplets, with increase of the droplet weight. Thus the height of the spray chamber 11 is determined according to the speed of the contaminated air and the time of residence necessary for the purification of the air.

The filter 12 consists of several filter webs 36 arranged vertically one above the other, of which each two are combined into one endless filter belt 36 circulating about rollers 37, 38, one of which is driven. The filter webs 36 are of fabric consisting of synthetic plastics filaments.

Figure 4:
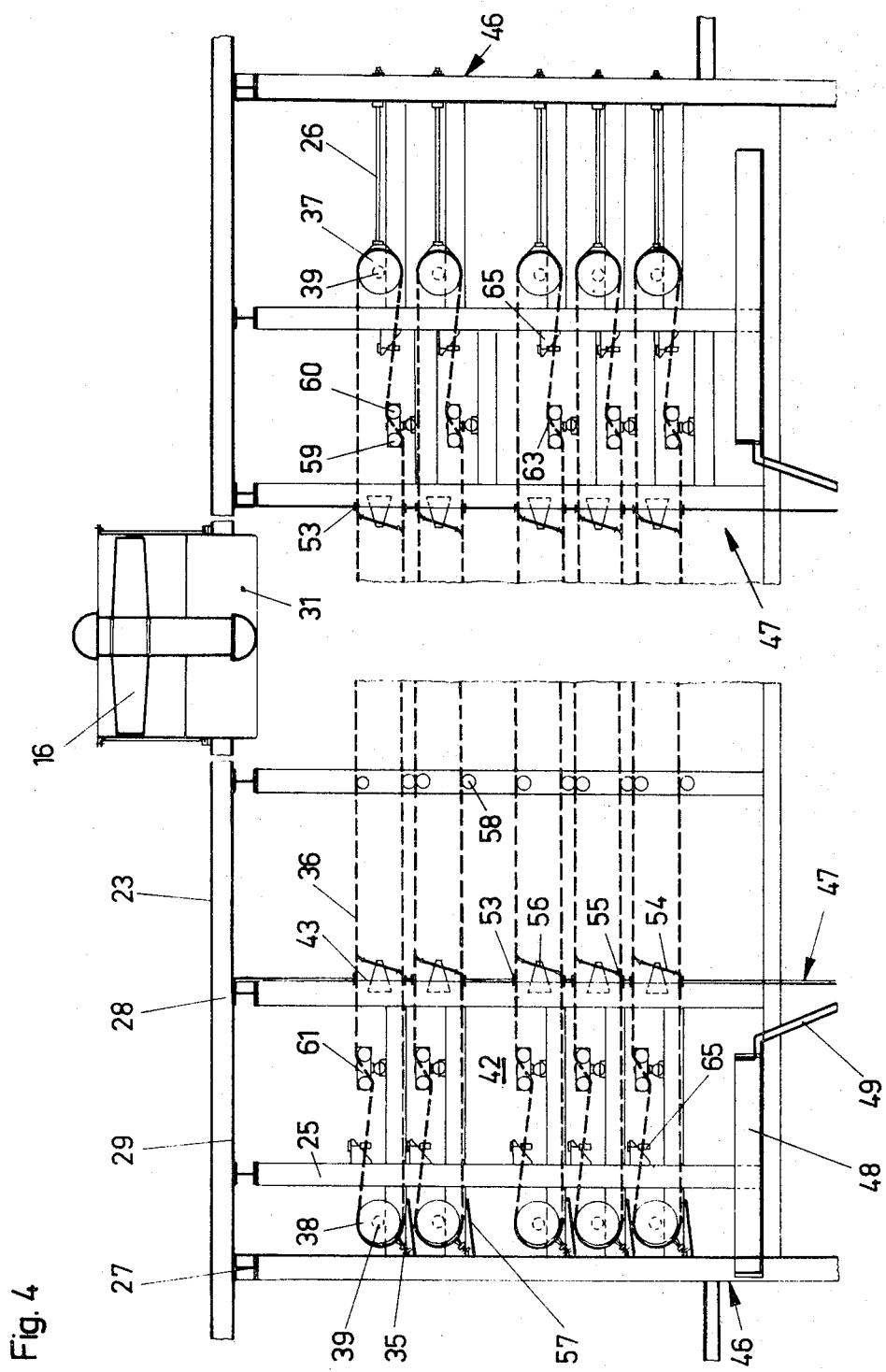
FIG. 4 is an enlargement of parts of FIG. 1.
Figure 5:
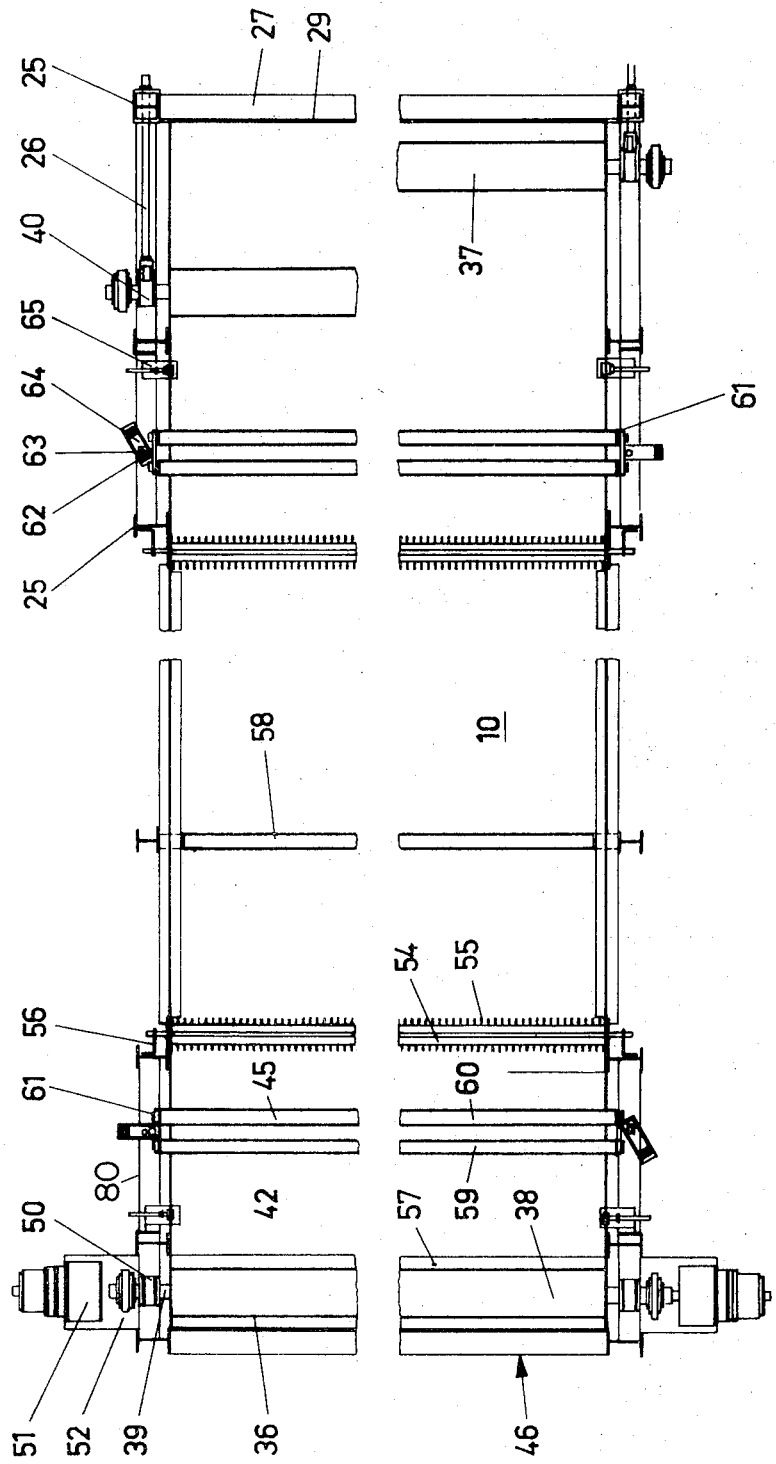
FIG. 5 is a plan of the parts shown in FIG. 4.

As shown in the right-hand parts of FIGS. 1 and 4, the rollers 37 are reversing rollers which are carried by means of shafts 39 in bearing brackets which rest on beams carried by some of the upright girders 25. The rollers 37 are accommodated in a housing 42 which also encloses, for each run of belt issuing from the housing, a device 45 which ensures the straight running thereof. The shafts 39 of the reversing rollers 37 are mounted for horizontal displacement by means of the tie bolts 26. Similar housing 42 with further fittings will be described in greater detail in connection with the mounting of the driven rollers 38.

In the present case a three-belt group and a two-belt group are arranged with vertical spacing from one another, the three-belt group being the lower. In the interspace thus produced, spray nozzles 13 are arranged, distributed uniformly over the length of the duct. These nozzles, like the nozzles 34, are fed through pipes 22. The nozzles 13 spray liquid in the horizontal direction as indicated in FIG. 3. Thus residues of substances accompanying the contaminated air, which have passed through the filters of the three-belt group, are picked up on water droplets, and rinsing and cleaning of the filter webs of the three-belt group are achieved. The filters of the two-belt group serve for the finest cleaning of the contaminated air current, and they hold back water particles carried in the current of contaminated air so that the cleaned air discharged has the lowest possible water content.

The layout as described here is to be understood as only by way of example. The number of filter webs 36, their grouping, and the number and arrangement of the spray nozzles 13 are largely dependent upon the composition of the contaminated air and upon what degree of purity of the emitted air is required.

The driven rollers 38 lying opposite to the rollers 37 are likewise screened off from the workshop contaminated air, in that the rollers 38 are in a housing 42, in which are openings 43 for the filter webs 36. The arrangement in a housing is made with the purpose of protecting the drive systems 51 and the devices 45 ensuring straight running of each filter web 36, by screening thereof against corrosive attack by the workshop contaminated air, and to simplify sealing problems. Moreover the housing 42 permits of discharging at one end of the duct 10 the components removed by means of devices 35 cleaning the filter webs 36.

The housing 42 consists of two partitions 46 and 47 extending parallel to one another at right angles to the walls 19 and 20, which partitions abut the horizontal wall 23 at the top of the shaft 10. In the direction towards the roof ridge 17, the housing 42 is open, and beneath the opening there is a collector trough 48, possibly also of a synthetic plastics material, with a drain pipe 49 which opens into the collector device 14. The drain pipe 49 can also deliver directly into a settlement installation from which spray liquid, after prior settling out of dissolved and solid contaminated air accompanying substances can be fed to the cycle again.

The rollers 38 are rotatably mounted by means of shafts 39 in mounting brackets 50, which are fixed to beam 80 carried by some of the uprights 25. Motors 51 are coupled to the rollers 38 to drive them. In the example shown, each two rollers 38 lying one below the other are driven at their opposite ends. The motors 51 are equipped with reduction gearings to achieve low roller rotation speeds, and are mounted on brackets 52 connected with the framework of the duct. FIG. 2 shows a drive for each roller 38 in the form of an electric motor 51, but it is also possible to have a chain or gear drive for all rollers 38 from only one motor.

For each filter web 36 a passage opening 43 is provided in the partition 47, which opening is provided with seals 53 to prevent the entry of workshop contaminated air into the housing 42. The height of the passage openings 43 corresponds to the roller diameter with an addition for the double filter belt thickness and an addition for sliding seals 53 of strip form against the respective outsides of the upper and lower runs. Between the inner sides of the respective lower and upper runs an opening occurs through which uncleaned workshop contaminated air could enter the housing 42. In order to close this opening, a pivotable flap 54 provided close to the passage opening is arranged between the insides of the upper and lower runs of the filter belt 36, which flap is equipped at its outer ends with sealing strips 55 which are in sliding engagement with the inner sides of the webs of the filter belt 36. The sealing strips 55 consist of flat brushes and by the pivotability of the flap 54 the brushes can be brought to abut on the belt. The length of the flap 54 corresponds to the width of the shaft 10. The width of the flap 54 with sealing strips is somewhat greater than the diameter of the rollers 38, so that a possibility of readjustment is provided if necessary for compensation of brush wear. It has proved advantageous to secure the brushes replaceably on the ends of the flaps 54. The mounting of the flaps 54 takes place in arms 56 which are secured on certain of the girders 25.

As shown in FIG. 4, the devices 35 which clean adhering components from the filters 12 are arranged within the lefthand housing 42 and close to the rollers 38. In the present case the devices 35 consist of spray heads which emit washing liquid under pressure against the belt, whereby adhering substances collected from the air are expelled from the fabric. The use of washing liquid under pressure was selected because thus the washing liquid consumption can be appreciably reduced. Between each two rollers 38, for the purpose of screening the lower roller from the discharge of the upper roller, coverings 57 are secured on the housing wall 46 which conduct the discharge in the direction towards the housing wall 46.

Stationary or rotating brushes are also suitable as cleaning devices. These can be fed with liquid under pressure to increase their effectiveness. The length of the rotating or stationary brushes corresponds to the length of the rollers 38.

The devices 45 which ensure straight running of the filter belts engage the runs issuing from the housing 42. Each device 45 consists of two rolls 59 and 60 extending over the width of the fabric web, with the fabric webs running partially round the rolls 59 and 60. The rolls 59 and 60 are mounted on one side of the duct in a fixed bracket 61. At the other side the rolls are mounted on a movable bracket connected by means of an extension 62 with a vertical gear output shaft 63 which is driven by a motor 64. By the rotation of the gear shaft the axes of the rolls 59 and 60 are inclined to a varying extent in relation to the direction transverse to the duct, whereby an influence is exerted upon the course of travel of the respective fabric web. Every deviation of the fabric web from its mean course beyond limits is detected by an edge sensor 65, which sets the motor 64 in action to correct the course of the web.

It is desirable to arrange the motors 64 outside the housings 42, and permit the rolls 59 and 60 to extend through the walls 19 and 20. Since the rolls have to carry out only small angular movements, there are no sealing problems. A further possibility is to form the rolls to suit the width of the duct and carry only the extension 62 through the walls 19 and 20.

During operation of the apparatus, the filter belts 36 experience a multiple increase of their original weight by the depositing of washing liquid and substances separated from the contaminated air. Thus sagging of the fabric webs is unavoidable unless means are provided which eliminate the sag, these means consisting in the present case of rolls 58. The rolls 58, which for reasons of clarity of layout are merely indicated in FIG. 4 and are shown more clearly in FIGS. 6, 6A, and 7, 7A, extend between the walls 19 and 20, and are arranged lying in one plane at regular intervals in the direction of movement of the filter belts 36 between the rollers 37 and 38.

Figure 6A:
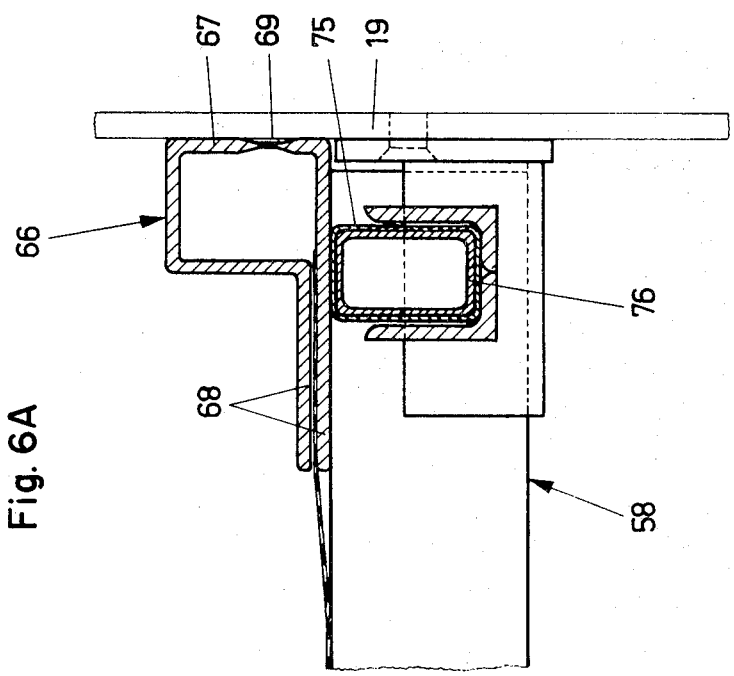
FIGS. 6 and 6A are fragmentary enlarged sections showing lateral seals of the filter webs along the longitudinal walls of the duct, FIG. 6 being a longitudinal section on the line II—II in FIG. 6A, and FIG. 6A being a transverse section on the line III—III in FIG. 6.
Figure 6:
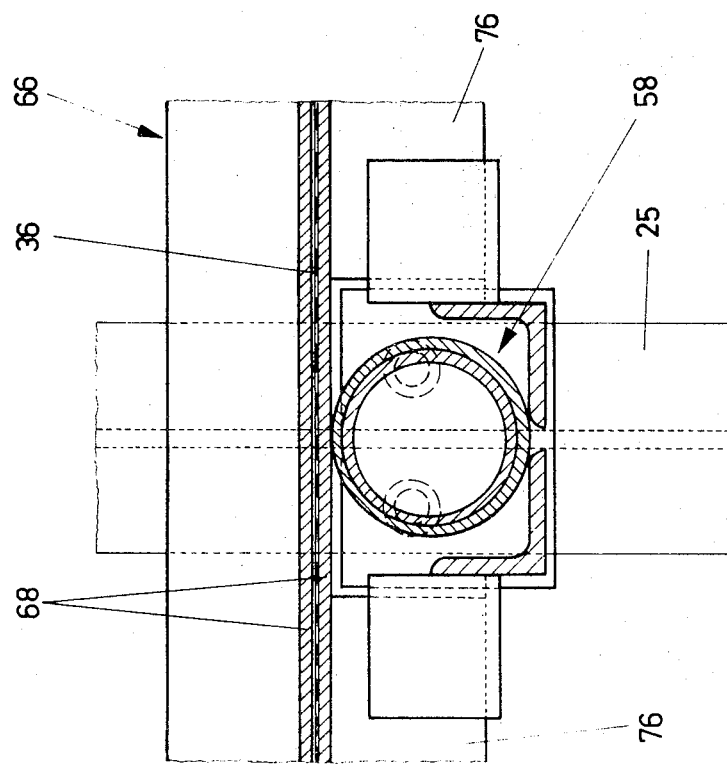

FIGS. 6 and 6A show a form of construction of a lateral seal for the filter belts 36 along the longitudinal walls 19, 20 of the duct 10. The longitudinal edges of the fabric belt are arranged for movement in a seal 66 mounted along each shaft wall 19, 20. The seal 66, which in the form as illustrated in FIG. 6 extends as uniform body along the duct walls, is supported by means of steel tubes 76 jacketed with plastics material 75, which in turn are secured to the shaft walls in the same way as described below in connection with FIG. 7. The seal 66 consists of a box profile 67 having, on a side facing the duct interior and at the lower end of this side, two extensions 68 arranged with spacing from one another and leaving a gap between them, between which the respective side of the filter belt 36 is received. The profile 67 is preferably produced from flexible plastics material. On the side of the profile 67 which can be brought into abutment with the wall 19 or 20 of the duct 10, a section 69 of reduced cross-section serves as a hinge so that the extensions 68 can be hinged open for the introduction of the fabric web.

FIGS. 7 and 7A show a seal which consists of a corrosion-resistant plastics strip 70 extending along each of the longitudinal duct walls 19 and 20. This strip 70 is mounted on a steel tube 76 jacketed with plastics material 75 and extending between pairs of brackets 79, which are arranged at regular intervals along the duct walls. The filter belt 36 slides on the strip 70. Each bracket 79 consists of a plate 78 secured by means of screws 73 to one of the upright girders 25. Angle pieces 74 extending in the direction towards the interior of the duct 10, forming an open box profile seen in the direction of travel of the air, are provided on this plate 78. On the vertical arms of the angle pieces 74 two angle pieces 77 are secured which likewise constitute a box profile open in the direction of travel of the air.

Between each two brackets, namely into the box profile formed by the angle pieces 77, are inserted the ends of the steel tubes 76, so that a continuous support surface is produced between each pair of brackets 79 which carries the seal 66 in the form of the profile 67 or synthetic plastics strip 70.

The angle pieces 74, by their vertical and horizontal arms, form a support for the loose mounting of the rolls 58. The second loose bearing of the roll 58 is formed by the corresponding bracket 79 arranged on the opposite duct wall. The rolls 58 opposing sagging of the fabric web consist of a steel core 72 which is jacketed with plastics material 71. The plastics strip 70 is interrupted between the upper ends of the vertical arms of the angle pieces 74, and the roll 58 is so dimensioned that its outer periphery lies in the same plane as the surface of the plastics strip 70 carrying the filter belt 36. A gap intended for conducting spray liquid away is arranged between the ends of the horizontal arms of the angle pieces 74.

The apparatus works as follows:

The contaminated air in the workshop rises, urged by the upward pressure gradient existing in the workshop, and assisted by the axial fans 16, in the direction towards the duct 10. It flows around the collector device 14 in order to enter the spray chamber 11 through the contaminated air inlets 15. Here it comes into contact with liquid from the spray nozzles 34, and gives off a part of its accompanying substances to the liquid. At the same time the contaminated air experiences a certain acceleration by the injector action which is caused by the vertically-acting spray nozzles 34. From the spray chamber 11 the contaminated air rises in the direction towards the filter 12, in order to deposit the remaining accompanying substances on the filter and the liquid held in the filter 12. The main purification effect lies in the group of the three belts, which are constantly wetted and kept rinsed by the nozzles 13. A concluding very fine purification takes place in the group of two belts, and this group of two additionally carry out the task of reducing the water content of the air current issuing from the fan 16.

The filter belts 36 move constantly or at time intervals along the cross section of the duct 10, and thus are supplied to the cleaning devices 35 which expel the deposited substances from the fabric, for example by means of liquid under pressure, and flushes them away in the direction towards the collecting trough 48. The belts may be driven with speeds different from one another, and with variable speed. The washing liquid can also contain detergents. The liquid collected in the trough 48 is fed to a subsequent recovery plant. The washing liquid from the collecting device 14 is likewise recovered, either separately or together with that from the collecting trough 48. So that no unpurified workshop contaminated air can pass through the duct 10 by passing the filter 12, that is in the style of a short-circuit, the rollers 37, 38 are arranged in a housing 42. For the same purpose the filter 12 extends into seals 66 which grasp around the edges of the belt. Housings 42 and seals 66 would lose effectiveness if the filter belts 36 could vary their precisely prescribed course of movement within the duct 10, because gaps producing a contaminated gas short-circuit would then occur along the shaft walls 19, 20, with damage to the fabric belt edges. The edge sensor 65 detects variations of course of the travel of the fabric belt and sets a motor 64 in operation, on deviation from the prescribed direction of movement, which motor shifts the position of the rolls 59, 60 in the appropriate direction until straight running of the fabric belt is restored.

What we claim is:

1. Apparatus for cleaning contaminated exhaust air from a workshop, including a vertically-extending duct which is rectangular in cross section with length greater than width, at least two sheets, each of which comprising an endless belt of a filter material, one above the other, extending in horizontal planes and each of which covering the cross section of the duct, end rollers about which said endless belt runs, a wall for separating said end rollers from the interior of said duct, said wall defining at least one opening through which passes said belt, moving means for moving the sheets in the direction of the length of the cross section, cleaning means for cleaning the sheets, alignment means for ensuring straight running of the sheets, first sealing means for engaging the longitudinal edges of each of the sheets by a seal throughout the length of the cross section of the duct, second sealing means cooperating with said belt to seal said opening against the passage of air therethrough, first means for maintaining a mist of water in a first space below the lower sheet, and second means for spraying water into a second space between the two sheets.

2. The apparatus as claimed in claim 1, wherein there is a single opening through which pass upper and lower runs of said belt, and wherein said second sealing means includes a flap between the runs of the belt arrange to pivot about an axis transverse to said duct and thereby cooperating to make sealing engagement with both runs of said belt.

3. The apparatus as claimed in claim 2, wherein said second sealing means comprises sealing brushes along those two edges of said flap engaging the runs of said belt.

4. The apparatus as claimed in claim 1, wherein said cleaning means is separated from the interior of said duct by one of said walls.

5. The apparatus as claimed in claim 4, wherein said cleaning means comprises a spray means for delivering water under pressure against said material.

6. The apparatus as claimed in claim 4, wherein said cleaning means comprises a stationary brush means and a water supply means.

7. The apparatus as claimed in claim 4, wherein said cleaning means comprises a rotary brush means and a water supply means.

8. The apparatus as claimed in claim 1, wherein said alignment means comprises two rolls, said rolls being mounted so that, as seen in a plan view, their axes may be inclined to a variable small extent with respect to the direction of the width of said duct.

9. The apparatus as claimed in claim 8, wherein said alignment means further comprises sensor means engaging an edge of one of the runs of said belt, and automatic means, controlled by the sensor, for varying the inclination of said rolls in response to said sensor means.

10. The apparatus as claimed in claim 1, wherein said first means comprises upwardly-directed water nozzles and said second means comprises horizontally-directed water nozzles.

11. The apparatus as claimed in claim 1, further comprising first collecting means for collecting dirty water settling from said first space, second collecting means for collecting dirty water from said cleaning means, and treating means for treating the water for re-use.

12. The apparatus as claimed in claim 1, wherein said filter material comprises filaments of a plastics material.

13. The apparatus as claimed in claim 1, wherein each of said sheets of said filter material is supported by a respective series of rolls, the axes of which rolls lie parallel to the direction of the width of the cross section of said duct.

14. The apparatus as claimed in claim 1, wherein said duct has a top wall defining openings, in each of which opening is an extractor fan.

15. The apparatus as claimed in claim 1, further comprising conduit means for conducting said contaminated air up to the roof of said workshop for cleaning.

16. The apparatus as claimed in claim 15, wherein said workshop includes an aluminum fusion electrolysis furnace.

* * * * *